(12) United States Patent
Sharivker et al.

(10) Patent No.: US 9,889,509 B2
(45) Date of Patent: Feb. 13, 2018

(54) CUTTER HEADS WITH IMPROVED COUPLING

(71) Applicant: Kennametal Inc., Latrobe, PA (US)

(72) Inventors: Leonid B Sharivker, Naharia (IL);
Sergei V Boulakhov, Naharia (IL);
Christoph Gey, Furth (DE); Ruy Frota de Souza Filho, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 327 days.

(21) Appl. No.: 14/269,808

(22) Filed: May 5, 2014

(65) Prior Publication Data
US 2015/0314379 A1    Nov. 5, 2015

(51) Int. Cl.
B23C 5/10        (2006.01)
B23C 5/26        (2006.01)
B23B 31/11       (2006.01)

(52) U.S. Cl.
CPC ............ B23C 5/10 (2013.01); B23B 31/1115 (2013.01); B23C 5/26 (2013.01); B23C 2210/02 (2013.01); B23C 2210/40 (2013.01); B23C 2240/32 (2013.01); B23C 2260/28 (2013.01); Y10T 407/1908 (2015.01); Y10T 407/1946 (2015.01)

(58) Field of Classification Search
CPC ............ B23B 31/1122; B23C 2210/02; B23C 2240/32; B23C 5/10; B23C 2210/03
USPC ..... 408/226, 233, 231, 238, 239 R; 411/307, 411/412, 413
See application file for complete search history.

(56) References Cited

U.S. PATENT DOCUMENTS

| 756,339 | A | | 4/1904 | Down |
| 1,083,747 | A | | 1/1914 | Kocher |
| 1,191,717 | A | | 7/1916 | Moore |
| 1,354,097 | A | | 9/1920 | Fitzsimmons |
| 1,407,335 | A | * | 2/1922 | Reynolds ............ B23B 31/1107 279/100 |
| 1,615,233 | A | | 1/1927 | Rediriger |
| 1,881,024 | A | | 10/1932 | Lang |
| 1,919,553 | A | | 7/1933 | Hawthorne |
| 2,079,692 | A | | 5/1937 | Francis |
| 2,158,120 | A | | 5/1939 | Hirscberg |

(Continued)

FOREIGN PATENT DOCUMENTS

| CH | 238003 A | 6/1945 |
| CN | 101155655 A | 4/2008 |

(Continued)

OTHER PUBLICATIONS

Jun. 17, 2015 Office action (3 months) 1 20150030398A1.

(Continued)

*Primary Examiner* — Sara Addisu
(74) *Attorney, Agent, or Firm* — Ian K. Samways (57) ABSTRACT

A modular cutter head having a holder defining a threaded receiver. The cutter head can be screwed into the threaded receiver. The cutter can comprise an elongated body portion having a cutting end and cutting edge and an elongated coupling portion spaced from the cutting end, with the coupling portion comprising a core and a plurality of generally helically-extending start threads disposed circumferentially about the core. The cutter head may also include a cutting end having a chip flute and an insert seat.

23 Claims, 10 Drawing Sheets

(56) References Cited

U.S. PATENT DOCUMENTS

| | | |
|---|---|---|
| 2,328,602 A | 9/1943 | Bechler |
| 2,367,841 A | 1/1945 | Monroe |
| 2,532,632 A | 12/1950 | Macarthur |
| 2,745,685 A | 5/1956 | Moore |
| 3,047,316 A * | 7/1962 | Wehring ............... E21B 17/042 285/334 |
| 3,061,025 A | 10/1962 | Stockard, Jr. |
| 3,153,356 A | 10/1964 | Dearborn |
| 3,304,816 A | 2/1967 | Galomeau |
| 3,304,818 A | 2/1967 | Heaton |
| 3,326,581 A | 6/1967 | Fou |
| 3,454,070 A | 7/1969 | Phipard, Jr. |
| 3,521,507 A | 7/1970 | Robinson et al. |
| 3,568,353 A | 3/1971 | Kilgore |
| 3,582,117 A | 6/1971 | Olof |
| 3,876,319 A | 4/1975 | Meyer |
| 3,933,210 A | 1/1976 | Skidmore |
| 3,945,446 A | 3/1976 | Ostertag et al. |
| 4,113,290 A | 9/1978 | Miida |
| 4,158,973 A | 6/1979 | Schumacher, Jr. |
| 4,262,400 A | 4/1981 | Miesch |
| 4,295,751 A | 10/1981 | Holmberg |
| 4,332,502 A | 6/1982 | Wormald et al. |
| 4,438,953 A | 3/1984 | Timme, Jr. |
| 4,489,963 A | 12/1984 | Raulins et al. |
| 4,521,042 A | 6/1985 | Blackburn |
| 4,548,431 A | 10/1985 | Hall et al. |
| 4,629,222 A | 12/1986 | Dearden et al. |
| 4,663,721 A * | 5/1987 | Herscovici .......... B23F 23/1287 318/561 |
| 4,688,832 A | 8/1987 | Ortloff |
| 4,699,549 A | 10/1987 | Shimomura et al. |
| 4,748,879 A | 6/1988 | von Haas |
| 4,828,294 A | 5/1989 | Bounie et al. |
| 4,842,464 A | 6/1989 | Green |
| 4,846,614 A * | 7/1989 | Steinbock ............... F16B 33/02 411/263 |
| 4,923,344 A | 5/1990 | Bieri |
| 4,955,644 A | 9/1990 | Pfeiffer et al. |
| 4,961,469 A | 10/1990 | Larsson et al. |
| 4,984,829 A | 1/1991 | Saigo et al. |
| 5,024,563 A * | 6/1991 | Randall ................ B23B 27/007 407/48 |
| 5,114,286 A * | 5/1992 | Calkins .................. B23B 31/11 408/226 |
| 5,169,183 A | 12/1992 | Hallez |
| 5,238,335 A | 8/1993 | Nomura |
| 5,415,243 A | 5/1995 | Lyon et al. |
| 5,492,375 A | 2/1996 | Smith |
| 5,496,137 A * | 3/1996 | Ochayon ................... B22F 5/06 408/226 |
| 5,598,751 A | 2/1997 | Ochayon et al. |
| 5,607,263 A | 3/1997 | Nespeta et al. |
| 5,624,213 A * | 4/1997 | Anderson .......... B23B 51/0473 144/23 |
| 5,647,447 A | 7/1997 | Jones |
| 5,672,037 A | 9/1997 | Iwata |
| 5,695,304 A | 12/1997 | Ebert |
| 5,699,867 A | 12/1997 | Jones |
| 5,788,401 A | 8/1998 | Drenth |
| 5,810,401 A | 9/1998 | Donald E Dosing David L Sipos |
| 5,863,162 A | 1/1999 | Ronny Karisson 011E Wagne |
| 5,873,687 A | 2/1999 | Watanabe |
| 5,899,642 A | 5/1999 | Berglow et al. |
| 5,947,660 A | 9/1999 | Karlsson et al. |
| 5,971,670 A * | 10/1999 | Pantzar ............... B23B 31/1107 407/119 |
| 5,984,030 A | 11/1999 | Larsson et al. |
| 6,000,005 A | 12/1999 | Yamada |
| 6,012,881 A | 1/2000 | Scheer |
| 6,030,004 A * | 2/2000 | Schock .................. F16B 33/02 285/333 |
| 6,086,291 A | 7/2000 | Hansson et al. |
| 6,109,841 A | 8/2000 | Johne |
| 6,120,067 A | 9/2000 | Mosing et al. |
| 6,155,613 A * | 12/2000 | Quadflieg ............. F16L 15/001 285/334 |
| 6,158,785 A | 12/2000 | Beaulier et al. |
| 6,224,631 B1 | 5/2001 | Kohrs |
| 6,241,433 B1 | 6/2001 | Rydberg et al. |
| 6,276,879 B1 | 8/2001 | Hecht |
| 6,299,180 B1 | 10/2001 | Satran et al. |
| 6,394,648 B1 | 5/2002 | Tseng |
| 6,394,711 B1 * | 5/2002 | Brosius .................... B23C 5/10 279/8 |
| 6,406,226 B2 | 6/2002 | Kojima |
| 6,409,175 B1 | 6/2002 | Evans et al. |
| 6,447,025 B1 | 9/2002 | Smith |
| 6,485,061 B1 | 11/2002 | Mosing et al. |
| 6,485,220 B2 | 11/2002 | Hecht |
| 6,494,648 B2 | 12/2002 | Harpaz |
| 6,517,123 B2 | 2/2003 | Nishio |
| 6,524,034 B2 | 2/2003 | Eng |
| 6,551,035 B1 | 4/2003 | Bruhn et al. |
| 6,565,291 B2 | 5/2003 | Harpaz et al. |
| 6,626,614 B2 | 9/2003 | Nakamura |
| 6,637,985 B2 | 10/2003 | Pokolm |
| 6,767,156 B1 | 7/2004 | Larsson |
| 6,783,308 B2 | 8/2004 | Lindblom |
| 6,810,956 B1 | 11/2004 | Sandstrom |
| 6,827,162 B2 | 12/2004 | Fisher |
| 6,845,826 B1 | 1/2005 | Feld et al. |
| 6,860,514 B2 | 3/2005 | Wentworth et al. |
| 6,918,723 B2 * | 7/2005 | Battig ..................... F01D 5/025 403/299 |
| 7,004,692 B2 | 2/2006 | Hecht |
| 7,101,128 B2 | 9/2006 | Hansson |
| 7,189,039 B2 | 3/2007 | Pantzar |
| 7,210,710 B2 | 5/2007 | Williamson et al. |
| RE39,869 E | 10/2007 | Payne et al. |
| 7,329,073 B2 | 2/2008 | Jonsson |
| 7,341,409 B2 | 3/2008 | Jonsson et al. |
| 7,374,376 B2 | 5/2008 | Jonsson et al. |
| 7,407,351 B2 | 8/2008 | Pantzar et al. |
| 7,431,543 B2 | 10/2008 | Buettiker et al. |
| 7,478,978 B2 | 1/2009 | Jonsson et al. |
| 7,513,724 B2 | 4/2009 | Kakai |
| D602,511 S | 10/2009 | Sandoval et al. |
| 7,611,311 B2 | 11/2009 | Kakai |
| 7,624,822 B2 | 12/2009 | Olsson et al. |
| 7,713,004 B2 * | 5/2010 | Lehto .................... B23B 31/005 407/30 |
| 7,775,287 B2 | 8/2010 | Duggan et al. |
| 7,980,795 B2 | 7/2011 | Berglow et al. |
| 8,066,307 B2 | 11/2011 | Wahlstrom et al. |
| 8,226,333 B2 | 7/2012 | Kakai et al. |
| 8,245,798 B2 | 8/2012 | Nava et al. |
| 8,262,139 B2 | 9/2012 | Nava |
| 8,286,972 B2 | 10/2012 | Haimer |
| 8,312,615 B2 | 11/2012 | Frota de Souza Filho |
| 8,366,119 B2 | 2/2013 | Rimet |
| 8,408,848 B2 | 4/2013 | Hecht |
| 8,556,550 B2 | 10/2013 | Lutz et al. |
| 8,662,800 B2 | 3/2014 | Guay |
| 8,668,413 B2 | 3/2014 | Volokh |
| 8,690,500 B2 | 4/2014 | Spichtinger et al. |
| 8,939,685 B2 * | 1/2015 | Cigni ....................... B23C 5/10 407/11 |
| 2001/0041089 A1 * | 11/2001 | Hecht .................... B23B 31/11 403/343 |
| 2002/0021945 A1 * | 2/2002 | Harpaz ................. B23B 31/11 407/53 |
| 2002/0081162 A1 * | 6/2002 | Bucholz ................ B23F 21/005 407/23 |
| 2002/0159651 A1 | 10/2002 | Krenzer |
| 2003/0021651 A1 | 1/2003 | Suzuki et al. |
| 2003/0068209 A1 * | 4/2003 | Leibhard ................. E21B 10/58 408/231 |
| 2003/0210963 A1 * | 11/2003 | Kakai ................... B23B 31/008 408/231 |
| 2004/0208716 A1 | 10/2004 | Krenzer |

(56) References Cited

U.S. PATENT DOCUMENTS

| | | | |
|---|---|---|---|
| 2005/0063796 A1* | 3/2005 | Dicke | F16B 35/065 411/399 |
| 2005/0129477 A1 | 6/2005 | Pantzar | |
| 2006/0062642 A1 | 3/2006 | Jonsson et al. | |
| 2006/0072977 A1* | 4/2006 | Jonsson | B23B 31/1107 408/233 |
| 2006/0073744 A1* | 4/2006 | Jonsson | B23B 31/11 439/884 |
| 2006/0133912 A1* | 6/2006 | Commins | E04B 1/2604 411/536 |
| 2006/0257215 A1* | 11/2006 | Kakai | B23B 31/11 407/101 |
| 2007/0071570 A1* | 3/2007 | Smolarek | F16B 19/1054 411/14.5 |
| 2007/0116539 A1 | 5/2007 | Malik et al. | |
| 2007/0248421 A1 | 10/2007 | Kakai et al. | |
| 2009/0010709 A1 | 1/2009 | Berglow et al. | |
| 2010/0123311 A1 | 5/2010 | Church | |
| 2011/0013999 A1 | 1/2011 | Moseley | |
| 2011/0211921 A1* | 9/2011 | Volokh | B23B 31/113 407/40 |
| 2011/0280683 A1 | 11/2011 | Galipaud | |
| 2011/0309588 A1 | 12/2011 | Heinloth et al. | |
| 2012/0009027 A1* | 1/2012 | Sharivker | B23B 31/11 407/42 |
| 2012/0020749 A1 | 1/2012 | Maeda et al. | |
| 2012/0093602 A1* | 4/2012 | Osawa | B23B 31/005 408/239 R |
| 2012/0121344 A1 | 5/2012 | Schuffenhauer et al. | |
| 2012/0208147 A1 | 8/2012 | Krumsiek | |
| 2012/0273233 A1* | 11/2012 | Drenth | E21B 17/042 166/380 |
| 2013/0022415 A1 | 1/2013 | Osawa et al. | |
| 2013/0028669 A1* | 1/2013 | Cigni | B23C 5/10 407/11 |
| 2013/0051935 A1 | 2/2013 | Schuffenhauer et al. | |
| 2013/0272806 A1 | 10/2013 | Guay | |
| 2014/0056658 A1* | 2/2014 | Maeda | B23C 5/109 407/40 |
| 2014/0237881 A1* | 8/2014 | MacK | F41A 21/325 42/90 |
| 2014/0360334 A1 | 12/2014 | Singer-Schnoeller | |
| 2015/0016905 A1 | 1/2015 | Haimer | |
| 2015/0151365 A1* | 6/2015 | Haimer | B23B 31/1107 279/99 |
| 2015/0202690 A1* | 7/2015 | Haimer | B23B 31/1115 279/99 |
| 2015/0217380 A1* | 8/2015 | Haimer | B23B 31/005 279/99 |
| 2015/0360295 A1* | 12/2015 | Haimer | B23B 31/1115 279/20 |
| 2017/0080501 A1* | 3/2017 | Best | B23B 51/048 |

FOREIGN PATENT DOCUMENTS

| | | |
|---|---|---|
| CN | 201324863 Y | 10/2009 |
| CN | 102837085 A | 12/2012 |
| CN | 104001980 A | 8/2014 |
| CN | 104001981 A | 8/2014 |
| DE | 1266613 B | 4/1968 |
| DE | 2602162 C2 | 8/1984 |
| DE | 3912503 A1 | 3/1990 |
| DE | 20202053 U1 | 6/2002 |
| DE | 0897504 B1 | 9/2003 |
| DE | 102005012025 A1 | 12/2006 |
| DE | 102012100976 B4 | 4/2014 |
| EP | 0240917 A2 | 10/1987 |
| EP | 0340187 B1 | 1/1993 |
| EP | 0551540 A1 | 7/1993 |
| EP | 0771400 B1 | 9/2001 |
| EP | 0815340 B1 | 3/2003 |
| EP | 0771934 B1 | 4/2003 |
| EP | 1127209 B1 | 5/2004 |
| EP | 1232321 B1 | 7/2004 |
| EP | 1280624 B1 | 1/2006 |
| EP | 0777545 B2 | 7/2010 |
| EP | 1847345 B1 | 12/2012 |
| EP | 2418036 B1 | 7/2013 |
| FR | 1019411 A | 1/1953 |
| FR | 1022682 A | 3/1953 |
| FR | 2602162 A1 | 2/1988 |
| GB | 191324122 A | 10/1914 |
| GB | 765943 A | 1/1957 |
| GB | 844212 A | 8/1960 |
| JP | 62188617 A | 8/1987 |
| JP | 2003011016 A | 1/2003 |
| JP | 2011161583 A | 8/2011 |
| JP | 2012071391 A | 4/2012 |
| WO | WO2002076661 A1 | 10/2002 |
| WO | WO2003068436 A1 | 8/2003 |
| WO | WO2006033616 A1 | 3/2006 |
| WO | WO2006050952 A1 | 5/2006 |
| WO | WO2011019105 A1 | 2/2011 |
| WO | 2011138360 | 11/2011 |
| WO | WO2013146882 A1 | 10/2013 |
| WO | WO2014026975 A1 | 2/2014 |
| WO | WO2014118264 A1 | 8/2014 |
| WO | WO2015032996 A1 | 3/2015 |

OTHER PUBLICATIONS

Jun. 29, 2015 First office action 14509061.
Jul. 30, 2015 International Search Report Received PCTUS2015029408.
Dec. 14, 2015 Final Office Action 20150030398A1.
Mar. 18, 2016 Office action (3 months) 2 20150030398A1.
Mar. 21, 2016 Office action (3 months) 1 20150030399.
Aug. 26, 2016 Final Office Action 2 20150030398A1.
Aug. 26, 2016 Final Office Action 20150030399.
Nov. 17, 2016 International preliminary report on patentability received 2015171721.
Nov. 17, 2016 International preliminary report on patentability received K-04440-WO-PCT.
May 22, 2017 First office action K-04148-CN-NP.

* cited by examiner

CUTTER HEADS WITH IMPROVED COUPLING

FIELD

The present invention relates to cutter heads and tools comprising cutter heads.

BACKGROUND

Often, modular cutter heads are utilized in cutting operations with reusable tool holders. However, cutting operations often create a high degree of stress on cutter heads and tools, which can result in decreased tool performance and/or decreased tool life. In many cases, coupling mechanisms between cutter heads and tool holders are unreliable. Therefore, there exists a need for improved cutter heads and/or tools that can provide reliable coupling mechanisms.

SUMMARY

In one aspect, cutter heads are described herein, which can provide one or more advantages over prior cutter heads. For example, a cutter head described herein can provide a balanced distribution of stresses introduced during cutting operations, thereby facilitating higher torque capabilities and increased productivity. In addition, a cutter head described herein can have a structure enabling interchangeability between cutting operations. Moreover, cutter heads described herein can be used with a variety of tools and/or tool holders having different sizes and/or shapes.

A cutter head described herein comprises an elongated body portion having a cutting end and an elongated coupling portion spaced from the cutting end. The coupling portion comprises a core and a plurality of generally helically-extending start threads disposed circumferentially about the core. Start threads of coupling portions can comprise square, triangular, or trapezoidal thread profile shapes. In some embodiments, coupling portions comprise at least two start threads. Further, coupling portions can comprise at least three start threads, including four or five start threads. Moreover, the start threads can comprise or define start indexes, pitches, leads, minor diameters, major diameters, pitch diameters, or combinations thereof.

Cutter heads described herein can have varied cross-sectional shapes. For example, a cross section of the coupling portion can be substantially circular. Alternatively, a cross-section of the coupling portion is non-circular. Similarly, the core of the coupling portion can have varied cross-sectional shapes. In some embodiments, a cross section of the core is substantially circular. In other embodiments, a cross section of the core is non-circular.

In another aspect, tools are described herein which can provide balanced distributions of stresses introduced in a holder of the tool and/or in a head of the tool during cutting operations. Therefore, in some embodiments, a tool described herein provides improved stress distribution during tool operation allowing higher torque capabilities and increased productivity. In addition, a tool described herein can have a structure enabling cutter head interchangeability between cutting operations.

A tool described herein comprises a holder defining a threaded receiver and a modular cutter head which can be screwed into the threaded receiver. The modular cutter head comprises an elongated body portion having a cutting end and an elongated coupling portion spaced from the cutting end, with the coupling portion comprising a core and a plurality of generally helically-extending start threads disposed circumferentially about the core. Additionally, the modular cutter head can further comprise a cutting end including a chip flute and at least one of a cutting edge and an insert seat. In some cases, each start thread of the modular cutter head defines a pitch, a lead, a major diameter, a minor diameter, and a pitch diameter. Further, in some cases, the threaded receiver includes a threaded interior surface defining a pitch, a lead, a major diameter, a minor diameter, and pitch diameter.

These and other embodiments are described in greater detail in the detailed description which follows.

DETAILED DESCRIPTION

Embodiments described herein can be understood more readily by reference to the following detailed description and drawings. Elements, apparatus, and methods described herein, however, are not limited to the specific embodiments presented in the detailed description and drawings. It should be recognized that these embodiments are merely illustrative of the principles of the present invention. Numerous modifications and adaptations will be readily apparent to those of skill in the art without departing from the spirit and scope of the invention.

In one aspect, cutter heads are described herein which, in some embodiments, demonstrate improved durability, modularity, and torque capabilities. Further, cutter heads described herein can provide configurations which permit a higher thread core diameter to head diameter ratio. Some prior cutter head coupling portions comprising only one start thread require a relatively small ratio of the core diameter and head diameter. Larger thread core to head diameter ratios generally result in improved tool strength and performance. As an increasing number of start threads are utilized, larger thread core diameters can be used relative to the head diameter, resulting in a higher thread core to head diameter ratio, which provides increased strength and performance in a cutter head, particularly with regard to the coupling portion. In some embodiments, cutter heads described herein comprise an elongated body portion having a cutting end and an elongated coupling portion spaced from the cutting end. Coupling portions of cutter heads described herein comprise a core and a plurality of generally helically-extending start threads disposed circumferentially about the core. Start threads of coupling portions can comprise square, triangular, or trapezoidal thread profile shapes. The coupling portions comprise at least two start threads or at least three start threads. In some embodiment, the coupling portions comprise four or five start threads.

Turning now to specific components, cutter heads described herein comprise an elongated body portion. Elongated body portions of cutter heads can comprise or be formed from any material not inconsistent with the objectives of the present invention. For example, an elongated body portion can comprise, consist, or consist essentially of hardened carbide, high speed steel, ceramic, cermet, cemented carbide or combinations thereof. An elongated body portion can comprise a cutting end of any shape, configuration, or design not inconsistent with the objectives of the present disclosure. For example, the cutting end can comprise a chip flute and at least one of a cutting edge and an insert seat. In certain embodiments, a cutting edge can be used where a unified cutting end configuration is desirable for certain cutting operations. In some embodiments, at least one insert seat can be used where utilization of replaceable inserts is desirable. An "insert seat" is an area on a cutting end of a tool which is configured to receive and/or secure a removable cutting tip. Any insert seat configuration not inconsistent with the objectives of the present disclosure can be used. Insert seats of cutter heads described herein can be configured to receive any cutting, milling, or turning inserts. For example, insert seats can be configured to receive and/or secure indexible cutting or milling inserts. In some embodiments, a plurality of insert seats disposed in a single flute can form a cutting edge comprising a plurality of cutting, milling, or turning inserts. In other embodiments, a single insert seat can be disposed within each of a plurality of flutes in a cutter head. Further, in some embodiments, a combination of at least one cutting edge and at least one insert seat can be used. Insert seats can be configured to couple with inserts via permanent or removable mechanical configurations.

Elongated body portions of cutter heads further comprise a coupling portion spaced from the cutting end. The coupling portion comprises a core and a plurality of generally helically-extending start threads disposed circumferentially about the core. A core of a coupling portion of the cutter head is a central component or region of a coupling portion on which threads can be disposed. The core extends axially away from the cutting end of the elongated body portion of the cutter head along the axis of rotation. At least two helically-extending start threads are disposed circumferentially about the core. Further, in some embodiments, coupling portions of cutter heads described herein comprise at least three start heads, including four or five start threads. Cores of coupling portions of cutter heads described herein can have any cross-sectional shape not inconsistent with the objectives of the present disclosure. For example, in some embodiments, a cross-section of the core taken along a plane perpendicular to the axis of rotation of the core is substantially circular. In some embodiments, a cross-section of the core is non-circular. For example, a cross-section of the core can be elliptical or comprise an irregular rounded shape.

Coupling portions of cutter heads having multiple start threads can have any start indexes not inconsistent with the objectives of the present disclosure. "Start index" refers to the starting position for individual start threads on a tool. In some embodiments, the start indexes are spaced apart from one another at substantially equal distances or radial/circumferential positions about the core. For example, in embodiments comprising three start threads, each start thread can be indexed 120° apart from one another circumferentially about the coupling portion. Alternatively, the start indexes are spaced apart at unequal distances or radial positions.

Each start thread of a coupling portion can define a pitch, a lead, a major diameter, a minor diameter, and a pitch diameter. The "pitch" of a start thread is the distance from a crest of one thread to the next crest in an axial direction parallel to the axis of rotation. In the case of a threaded tool comprising a single start thread, both crests correspond to the same thread. In the case of a threaded tool comprising more than one start thread, the two crests forming a pitch correspond to different threads. The "lead" of a start thread is the axial distance along the threaded portion of a tool that is covered by one complete rotation of the start thread around the circumference of the tool. In the case of threaded tools comprising a single start thread, the pitch and lead are the same. In the case of threaded tools comprising two or more start threads, the lead is larger than the pitch. A "major diameter" of a start thread is the larger of two extreme diameters delimiting the height of a thread profile when viewed as a cross-section. Conversely, a "minor diameter" of a start thread is the lowest extreme diameter of the thread. Stated differently, the minor diameter of a start thread corresponds to the circumferential surface of the core of a coupling portion of a cutting tool described herein. The "pitch diameter" of a particular thread is the diameter that cuts through a thread profile at a level where the width of the thread ridge is equal to the width of the thread groove.

The dimensions, orientations, and configurations of the pitch, lead, major diameter, minor diameter, and pitch diameter of coupling portions cutting tools described herein can take any form not inconsistent with the objectives of the present disclosure. For example, in some embodiments, the minor diameter of at least one start thread remains constant in an axial direction away from the cutting end. In some embodiments, the minor diameter of at least one start thread decreases in an axial direction away from the cutting end. Similarly, in some embodiments, the major diameter of at least one start thread remains constant in an axial direction away from the cutting end. In certain embodiments, the major diameter of at least one start thread decreases in an axial direction away from the cutting end. Further, in some embodiments, the pitch diameter of at least one start thread remains constant in an axial direction away from the cutting end. In some embodiments, the pitch diameter of at least one start thread decreases in an axial direction away from the cutting end. In some cases, two or more of the major diameter, minor diameter, and pitch diameter decrease axially away from the cutting portion, forming a taper, and such a tapered coupling portion can form a conical or frustoconical shape.

Cross sections of coupling portions of cutter heads described herein can take any shape not inconsistent with the objectives of the present disclosure. For example, a cross-section taken along a plane which lies perpendicular to the axis of rotation of the coupling portion can be substantially circular. In certain other embodiments, a cross section of the coupling portion is non-circular, such as elliptical or an irregularly rounded shape. Moreover, the lead can be a multiple of the pitch which is equal to the number of start threads disposed circumferentially about the core. For example, in some embodiments, a coupling portion described herein having two start threads comprises a lead which is double the pitch.

In addition, start threads described herein can have any cross-sectional shape or configuration not inconsistent with the objectives of the present disclosure. For example, start threads can have thread profiles can comprise square, triangular, or trapezoidal shapes. Square thread cross-sectional shapes comprise a flattened portion which is substantially parallel to a radial exterior portion of the core. Square thread cross-sectional shapes further comprise sides which are substantially perpendicular to the flattened portion. Triangular thread cross-sectional shapes can comprise isosceles, equilateral, and/or scalene triangular shapes. In some embodiments, trapezoidal thread shapes are formed which have a basic shape which corresponds to a triangular thread profile shape, but which is truncated. Where a triangular thread profile extends to a sharp "V" form, trapezoidal thread profiles comprise a flattened portion substantially parallel to a radial exterior surface of the core. In embodiments comprising trapezoidal thread profiles, the flattened portion forms the major diameter of the thread profile. In some cases, the major diameter of the thread is equal to the pitch diameter. In other cases, the major diameter of the thread is larger than the pitch diameter.

Any combination of the foregoing materials, shapes, and thread profiles can be used which are not inconsistent with the objectives of the present invention. For example, in some embodiments, a coupling portion of a cutter head comprises a major diameter, minor diameter, and pitch diameter which decrease in an axial direction away from the cutting portion, the coupling portion forming a frustoconical shape. Such embodiments can further comprise a trapezoidal thread profile shape wherein the flattened or truncated portion of the thread profile provides a major diameter larger than the pitch diameter, and wherein the flattened portion is substantially parallel to an exterior surface of the core.

In another aspect, tools are described herein which provide cutting, milling, or grinding utility while also providing a balanced distribution of stresses introduced in a holder of the tool and/or head of the tool during cutting operations, thereby enhancing tool usability and durability at high torque operations and providing desirable modularity. A tool described herein comprises a holder defining a threaded receiver and a modular cutter head which can be screwed into the threaded receiver in order to directly couple one to the other. The modular cutter head comprises an elongated body portion having a cutting end and an elongated coupling portion spaced from the cutting end. The coupling portion of the elongated body portion comprises a core and a plurality of generally helically-extending start threads disposed circumferentially about the core.

Turning now to specific components, tools described herein comprise a holder defining a threaded receiver. A threaded receiver includes a threaded interior surface defining a pitch, a lead, a major diameter, a minor diameter, and a pitch diameter. As threaded receivers are threaded internally, a minor diameter corresponds to a crest on a start thread, and a major diameter corresponds to a thread root. Any dimensions, orientations, or configurations not inconsistent with the objectives of the present disclosure can be used. For example, one or more of a major diameter, minor diameter, and pitch diameter can remain constant in an axial direction away from an opening in the holder, wherein the opening is configured to receive the cutter head. In some cases, one or more of a major diameter, minor diameter, and a pitch diameter can decrease in an axial direction away from the opening. Further, two or more of a major diameter, minor diameter, and a pitch diameter can decrease in an axial direction away from the opening, forming a taper in the threaded receiver.

Tools described herein further comprise a modular cutter head which can be screwed into the threaded receiver. The modular cutter head comprises an elongated body portion having a cutting end and an elongated coupling portion spaced from the cutting end. The coupling portion comprises a core and a plurality of generally helically-extending start threads disposed circumferentially about the core. Any cutter head consistent with the foregoing can be used. For example, in some embodiments, coupling portions of cutter heads described herein comprise at least two start threads disposed circumferentially about the core. In some embodiments, coupling portions of cutter heads described herein comprise at least three start threads disposed circumferentially about the core. Thread profiles of coupling portions of holders can form any cross-sectional shape not inconsistent with the present disclosure. For example, thread profile shapes can comprise square, triangular, or trapezoidal shapes.

Holders and cutter heads can be configured or formed with dimensions, parameters, or orientations which correspond to one another. Additionally, holders and cutter heads can be configured to be directly coupled to one another without additional components or structures. For example, the threaded interior surface can comprise a number of start threads which correspond to the number of start threads disposed on the coupling portion of the modular cutter. In some cases, the threaded interior surface comprises at least two start threads. In some embodiments, the threaded interior surface comprises at least three start threads. Further, in some embodiments, the lead of the threaded receiver is equal to the lead of the coupling portion of a tool described herein. Alternatively, the lead of the threaded receiver is unequal to the lead of the coupling portion. One or more dimensions of thread profiles of cutter head coupling portions and holder coupling portions can be configured to correspond to one another. In some cases, cutter head start threads and threaded receiver start threads can have threads with matching major diameters, minor diameters, and/or pitch diameters. Dependent upon the thread profile shapes and matching major, minor and/or pitch diameters, varying contact faces are possible within a cutter head start thread and threaded receiver thread interaction. For example, where trapezoidal thread profiles are used in both a cutter head coupling portion and a holder coupling portion with matching minor diameters, a contact surface is formed along the major diameter of each thread on a coupling portion which contacts the major diameter of the start threads in the threaded receiver. In embodiments comprising matching pitch diameters, a contact surface is formed along the thread sides, rather than the major and minor diameters of the start threads. In some cases, contact surfaces are formed along the major diameter, minor diameter, and sides of the start threads.

In addition, configurations of holders and cutter heads can be configured to provide desirable fit characteristics. For example, coupling portions of cutter heads can provide a major diameter, minor diameter, and pitch diameter which are larger than a major diameter, minor diameter, and pitch diameter of a corresponding holder. In such embodiments, direct coupling of the cutter head and the holder results in elastic deformation of the holder, providing an interference fit. Further, in some embodiments, a cutter head coupling portion may have a taper that is larger than the taper of the holder coupling portion.

Figure 1:
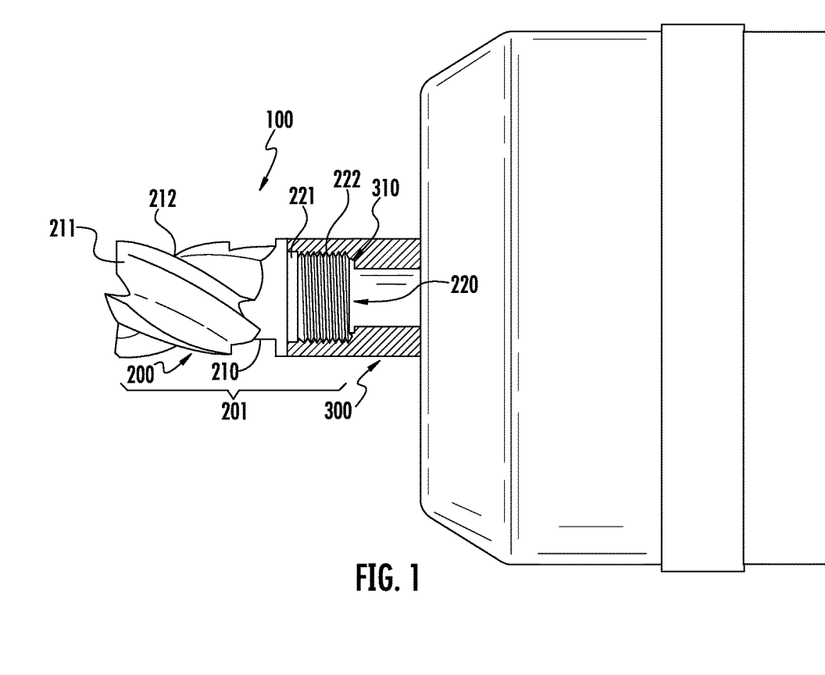
FIG. 1 illustrates a cross-sectional view of a tool according to one embodiment described herein.

Some embodiments will now be further described with reference to the figures. As understood by one of ordinary skill in the art, the various elements and/or components depicted in the figures are representational only and are not necessarily drawn to scale. FIG. 1 illustrates a cross-sectional view of a tool according to one embodiment described herein. The tool 100 in FIG. 1 comprises a holder 300 defining a threaded receiver 310 and a modular cutter head 200, which can be screwed into the threaded receiver 310. The modular cutter head 200 comprises an elongated body portion 201 having a cutting end 210 and an elongated coupling portion 220 spaced from the cutting end 210. The coupling portion 220 comprises a core 221 and a plurality of generally helically-extending start threads 222 disposed circumferentially about the core 221.

Figure 2A:
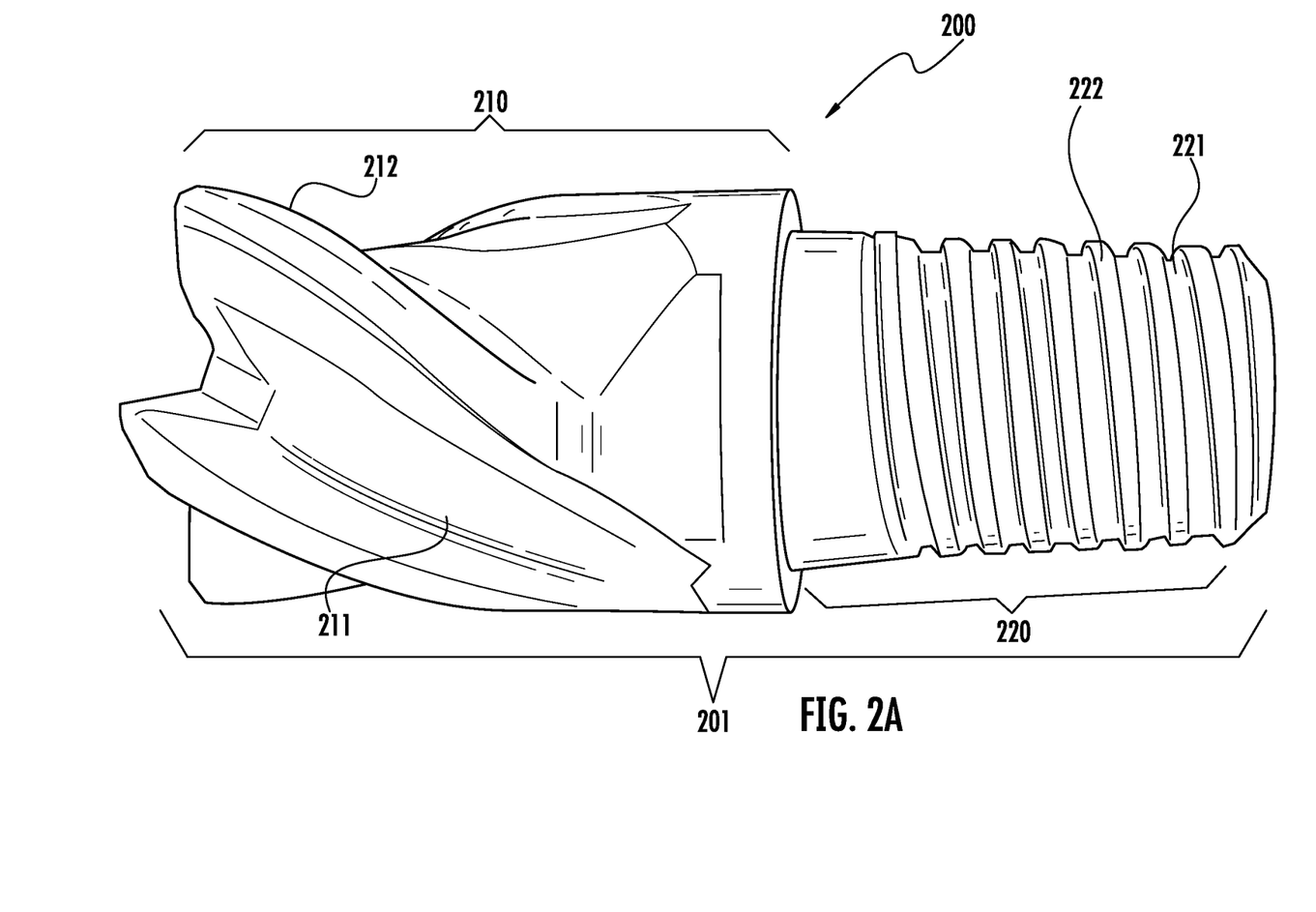
FIG. 2A illustrates a perspective view a cutter head according to one embodiment described herein.

FIG. 2A illustrates a perspective view a cutter head according to one embodiment described herein. The embodiment of FIG. 2A illustrates a cutter head 200 comprising an elongated body portion 201 having a cutting end 210 and an elongated coupling portion 220 spaced from the cutting end 210. The cutting end 210 has at least one flute 211 and at least one cutting edge 212. The coupling portion 220 comprises a core 221 and a plurality of generally helically extending start threads 222 disposed circumferentially about the core.

Figure 2B:
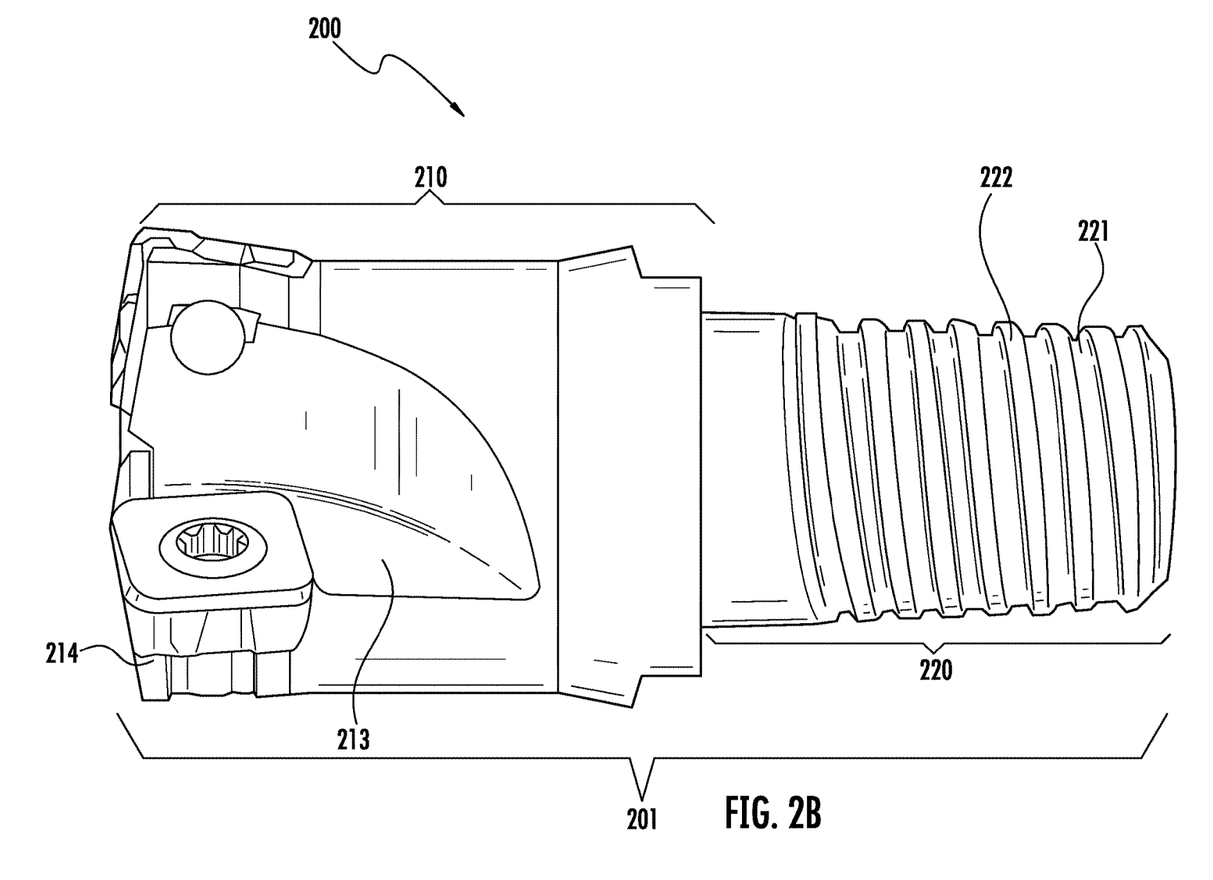
FIG. 2B illustrates a perspective view a cutter head according to one embodiment described herein.

FIG. 2B illustrates a perspective view of a cutter head according to one embodiment described herein. The embodiment of FIG. 2B illustrates a cutter head 200 comprising an elongated body portion 201 having a cutting end 210 and an elongated coupling portion 220 spaced from the cutting end 210. The cutting end 210 has at least one flute 213 and at least one insert seat 214. The coupling portion 220 comprises a core 221 and a plurality of generally helically extending start threads 222 disposed circumferentially about the core.

Figure 3:
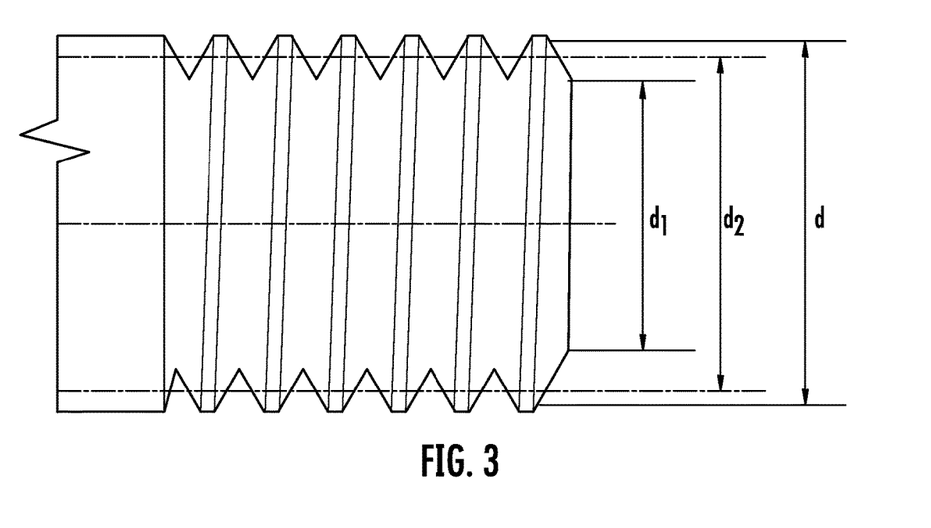
FIG. 3 illustrates a threading configuration described herein.

FIG. 3 illustrates a threading configuration described herein. FIG. 3 illustrates a minor diameter ($d_1$), a major diameter (d) and a pitch diameter ($d_2$) of a threading configuration.

Figure 4A:
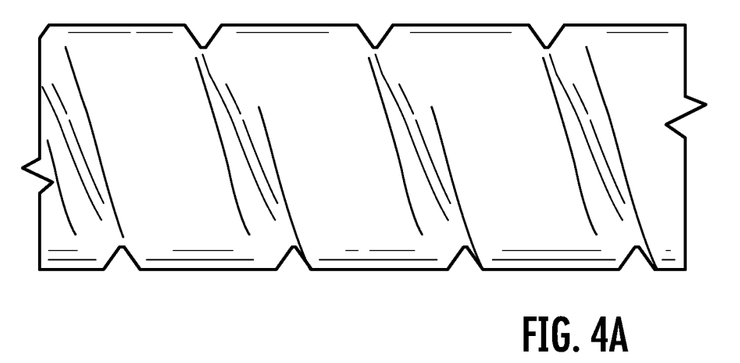
FIG. 4A illustrates a portion of a threading configuration of a cutter head described herein.
Figure 4B:
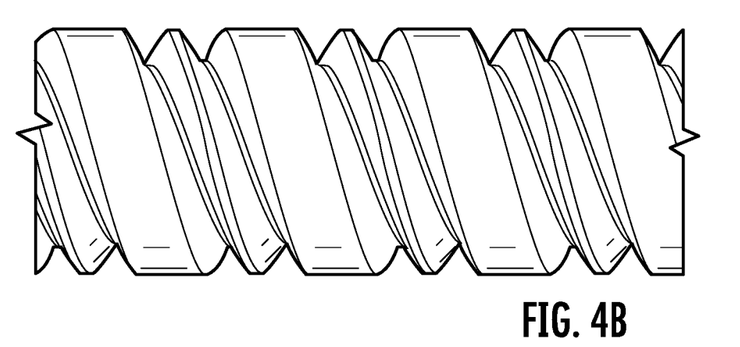
FIG. 4B illustrates a portion of a threading configuration of a cutter head described herein.
Figure 4C:
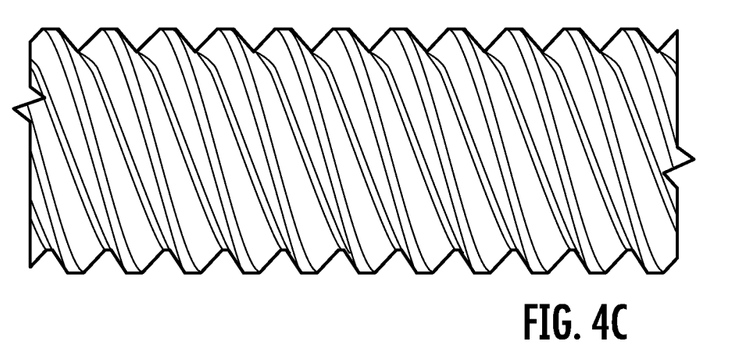
FIG. 4C illustrates a portion of a threading configuration of a cutter head described herein.

FIG. 4A illustrates a threading configuration of a cutter head described herein comprising a single start thread. FIG. 4B illustrates a threading configuration of a cutter head described herein comprising two start threads. FIG. 4C illustrates a threading configuration of a cutter head described herein comprising three start threads. Viewed together, FIGS. 4A, 4B, and 4C illustrate various stages of a coupling portion of one embodiment of a cutter head described herein during one non-limiting example of a method of forming multiple start threads. While other methods or processes can be used to form a cutter head described herein, the method depicted in FIGS. 4A, 4B, and 4C illustrates positioning of multiple start threads relative to one another in one embodiment of a cutter head described herein.

Figure 5:
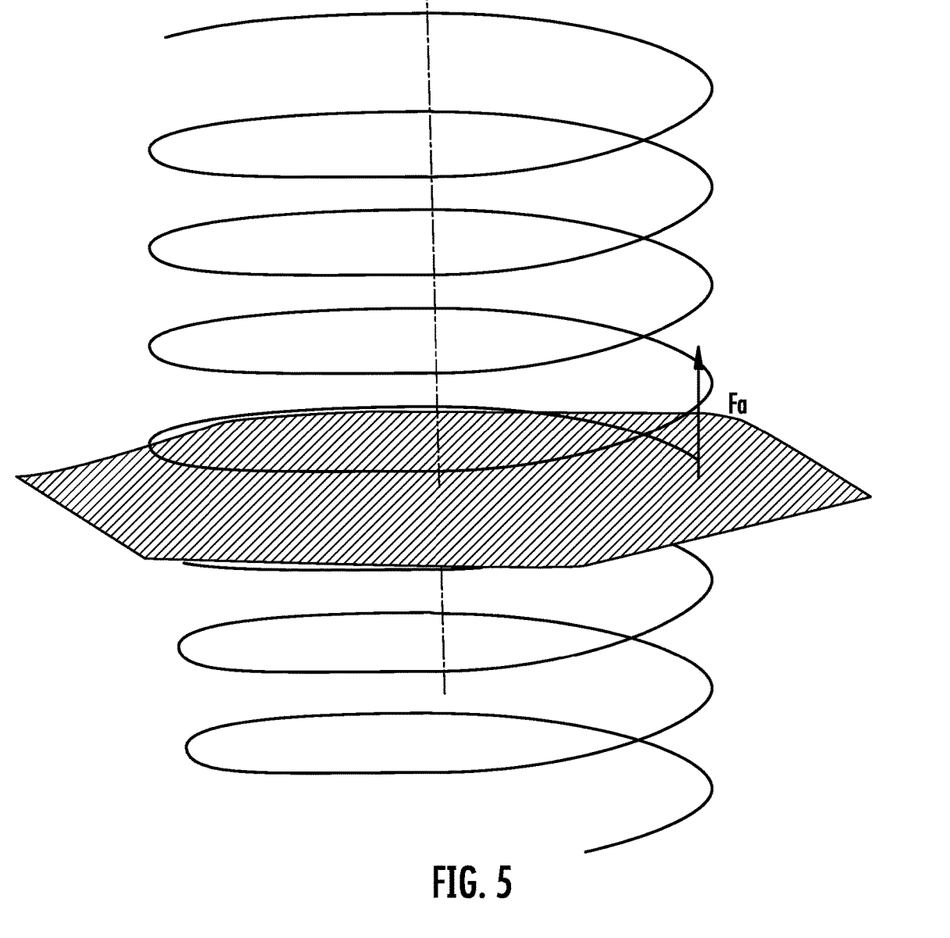
FIG. 5 illustrates a schematic diagram of a prior threading configuration described herein.

FIG. 5 illustrates a schematic diagram of a prior threading configuration described herein. As illustrated in FIG. 5, force is applied during a cutting operation along a plane, with the directionality of the applied force being designated by arrow $F_a$. As illustrated in FIG. 5, force is not applied symmetrically within the coupling portion, which results in an unbalanced stress distribution along the cutter head's rotating axis and also across 90 degree cross-sections.

Figure 6:
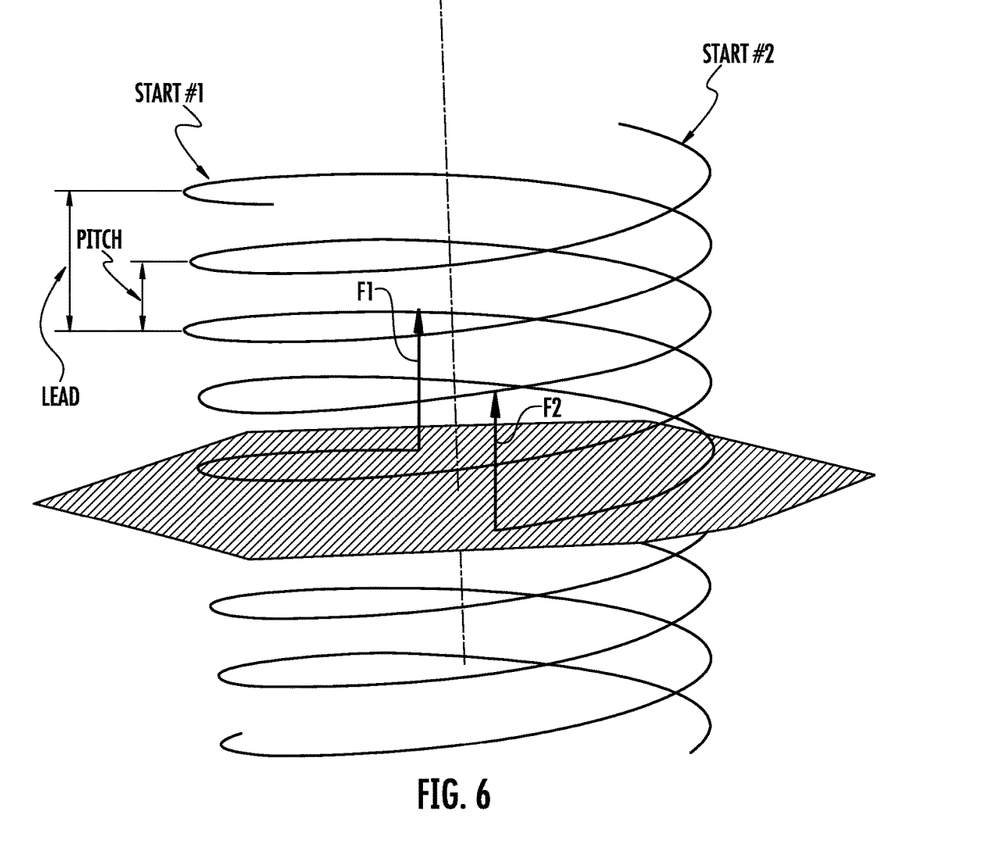
FIG. 6 illustrates a schematic diagram of a threading configuration according to one embodiment of a cutter head described herein.

FIG. 6 illustrates a schematic diagram a threading configuration according to one embodiment of a cutter head described herein. The embodiment of FIG. 6 comprises two start threads which form a pitch and a lead. In the embodiment of FIG. 6, the lead is twice the length of the pitch. Also illustrated in FIG. 6 is the force applied during a cutting operation, indicated by arrows $F_1$ and $F_2$. $F_1$ and $F_2$ demonstrate force applied along a cross-sectional plane which is symmetrical, resulting in a balanced stress distribution along the cutter head's rotating axis.

Figure 7:
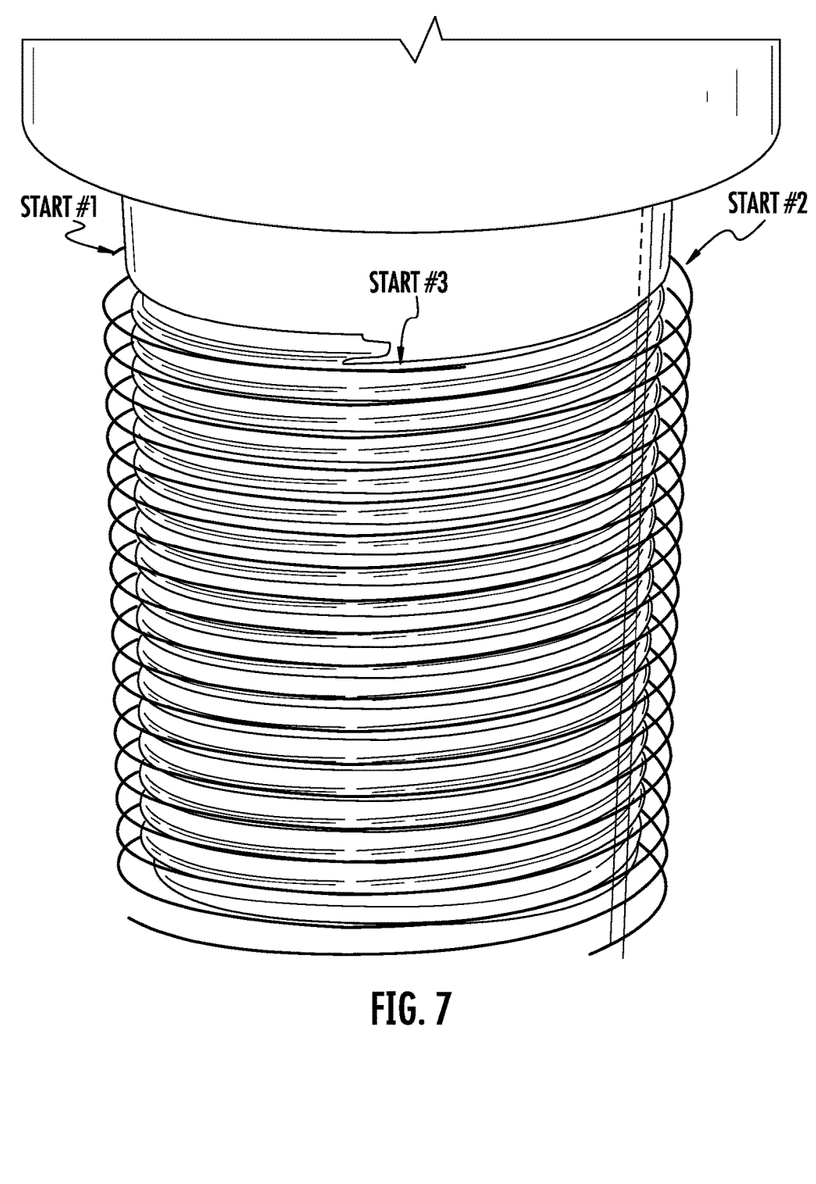
FIG. 7 illustrates a perspective view of a cutter head according to one embodiment described herein.

FIG. 7 illustrates a perspective view of a cutter head according to one embodiment described herein. The embodiment of FIG. 7 comprises three start threads having equal start indexes around the circumference of the coupling portion.

Figure 8A:
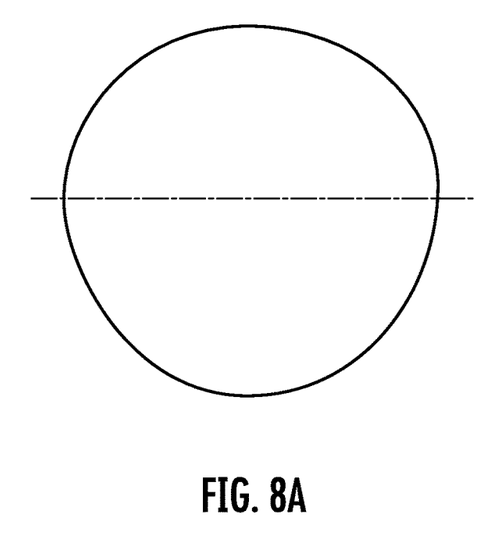
FIG. 8A illustrates a cross-sectional view of a prior cutter head described herein.
Figure 8B:
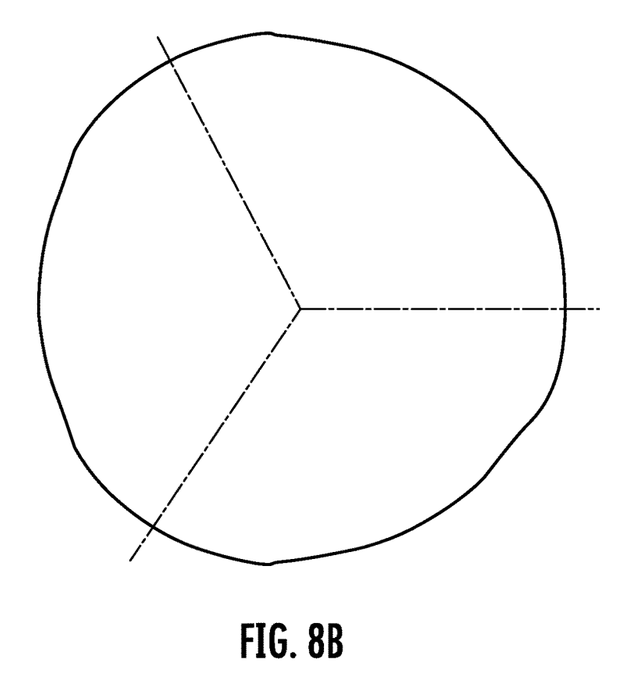
FIG. 8B illustrates a cross-sectional view of a cutter head according to one embodiment described herein.

FIG. 8A illustrates a cross-sectional view of a prior cutter head described herein. FIG. 8B illustrates a cross-sectional view of a cutter head according to one embodiment described herein. As seen in FIGS. 8A and 8B, increasing the number of start threads disposed circumferentially about the coupling portion, in some embodiments, results in an increasingly symmetric cross-sectional shape. In some embodiments, the cross-sectional shape becomes more circular with an increasing number of start threads. FIG. 8B represents a cross-section of one embodiment of a cutter head described herein comprising three start threads.

Figure 9:
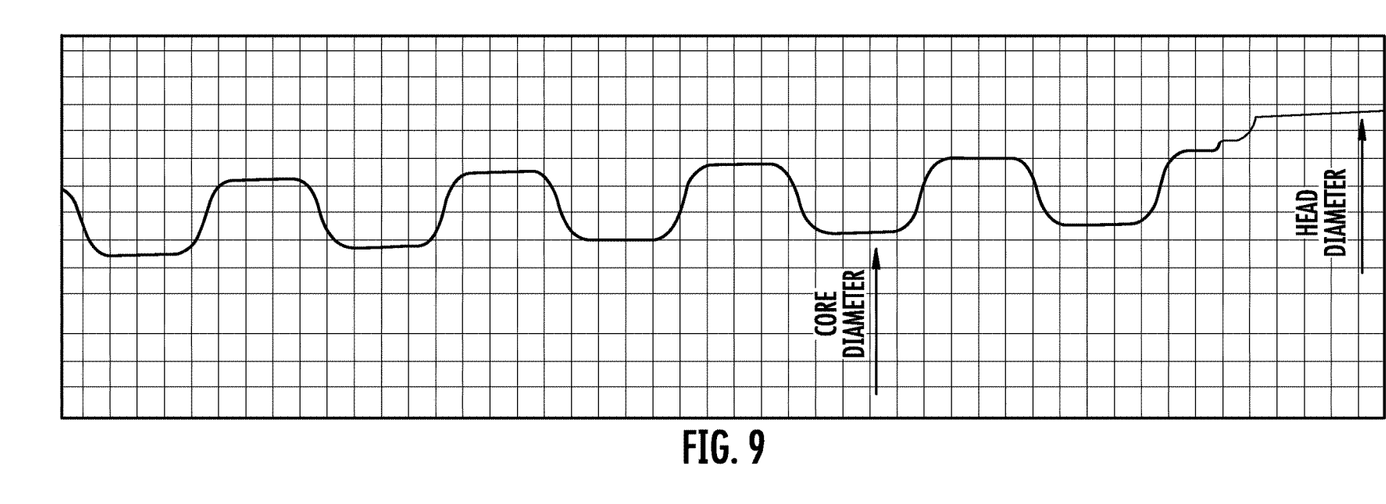
FIG. 9 illustrates a cross-sectional view of a portion of a cutter head according to one embodiment described herein.

FIG. 9 illustrates a cross-sectional view of a portion of a cutter head according to one embodiment described herein. FIG. 9 illustrates the relationship between a core diameter and a head diameter.

EXAMPLE 1

Cutter Head

Two cutter heads were electronically modeled and balancing analysis was performed on both cutter heads. Both cutter head models were modeled with a 16 mm head diameter comprising no cutting geometry. Model A was prepared as a comparative example of prior coupling portion configurations, and comprised a one start thread coupling configuration. Model B was prepared according to one embodiment of cutter heads described herein, and comprised two start threads in the coupling portion. Both models were simulated in operating conditions of 30,000.0 RPM in a blank material having a density of 14.5 g/cm$^3$. Model A comprised a total tool weight of 98.112 g, demonstrated an angular displacement during analysis of −115.112°, a radial displacement of 0.005 mm, and provided an unbalanced force of 12.964 g. Model B comprised a total tool weight of 103.612 g, demonstrated an angular displacement of −108.234°, a radial displacement of 0.0 mm, and provided an unbalanced force of 0.002 g.

Model B demonstrates that multiple start threads in cutter head couplings can provide improved characteristics in force and stress distribution. Further, the results of the balancing analysis demonstrate that coupling portions comprising a plurality of start threads can be appropriate on high RPM applications.

Many modifications and other examples of the disclosure set forth herein will come to mind to one skilled in the art to which the disclosure pertains having the benefit of the teachings presented in the foregoing descriptions and the associated drawings. Therefore, it is to be understood that the disclosure is not to be limited to the specific implementations disclosed and that modifications and other implementations are intended to be included within the scope of That which is claimed is:

1. A cutter head, comprising:
an elongated body portion having a cutting end and an elongated coupling portion spaced from the cutting end; and
the coupling portion comprising:
a core; and
a plurality of generally helically-extending start threads disposed circumferentially about the core,
wherein each of the start threads defines a start index and wherein the start indexes are spaced apart from one another at substantially equal distances or radial/circumferential positions about the core,
wherein each of the start threads defines a lead, the lead being defined as an axial distance covered by one complete rotation of the start thread about a circumference of the coupling portion, and
wherein the lead of one of the start threads is different from the lead of another one of the start threads.

2. The cutter head of claim 1, wherein the coupling portion comprises at least two start threads.

3. The cutter head of claim 1, wherein the coupling portion comprises at least three start threads.

4. The cutter head of claim 1, wherein the cutting end comprises a chip flute and at least one of a cutting edge and an insert seat; and
wherein each start thread further defines a pitch, a major diameter, a minor diameter, and a pitch diameter.

5. The cutter head of claim 4, wherein the major diameter, minor diameter, and pitch diameter of at least one start thread remain constant in an axial direction away from the cutting end.

6. The cutter head of claim 4, wherein at least one of the major diameter, minor diameter, and pitch diameter of at least one start thread decreases in an axial direction away from the cutting end.

7. The cutter head of claim 4, wherein at least two of the major diameter, minor diameter, and pitch diameter of at least one start thread decreases in an axial direction away from the cutting end, forming a taper.

8. The cutter head of claim 1, wherein a cross-section of the coupling portion taken along a plane perpendicular to an axis of rotation is substantially circular.

9. The cutter head of claim 1, wherein a cross-section of the coupling portion taken along a plane perpendicular to an axis of rotation is non-circular.

10. The cutter head of claim 1, wherein a cross-section of the core taken along a plane perpendicular to an axis of rotation is non-circular.

11. The cutter head of claim 1, wherein a cross-section of the core taken along a plane perpendicular to an axis of rotation is substantially circular.

12. A tool, comprising:
a holder defining a threaded receiver and an opening configured to receive a modular cutter head, the threaded receiver including a threaded interior surface having at least one lead;
wherein the modular cutter head can be screwed into the threaded receiver, the modular cutter head comprising:
an elongated body portion having a cutting end and an elongated coupling portion spaced from the cutting end; and
the coupling portion comprising:
a core; and
a plurality of generally helically-extending start threads disposed circumferentially about the core,
wherein each of the start threads defines a start index and wherein the start indexes are spaced apart from one another at substantially equal distances or radial/circumferential positions about the core, and
wherein each of the start threads defines a lead, the lead being defined as an axial distance covered by one complete rotation of the start thread about a circumference of the coupling portion;
wherein the holder and the cutter head are configured to be directly coupled to one another, and
wherein at least one lead in the threaded receiver is different from the lead of at least one of the start threads of the coupling portion.

13. The tool of claim 12, wherein the modular cutter head further comprises a cutting end including a chip flute and at least one of a cutting edge and an insert seat; and
wherein each start thread defines a first major diameter, a first minor diameter, and a first pitch diameter; and
wherein the threaded receiver includes a threaded interior surface having a second major diameter, a second minor diameter, and a second pitch diameter.

14. The tool of claim 13, wherein the threaded interior surface comprises a number of start threads corresponding to the number of start threads disposed on the coupling portion of the modular cutter.

15. The tool of claim 14, wherein at least one start thread on the cutter head and at least one start thread on the tool have a trapezoidal cross-sectional shape.

16. The tool of claim 15, wherein the first major diameter and the second major diameter contact one another when the cutter head and the holder are coupled.

17. The tool of claim 13, wherein the first major diameter, first minor diameter, and first pitch diameter of at least one start thread remains constant in an axial direction away from the cutting end, and wherein the second major diameter, second minor diameter, and second pitch diameter of the threaded receiver remain constant in an axial direction away from the opening.

18. The tool of claim 13, wherein at least two of the first major diameter, first minor diameter, and first pitch diameter of at least one start thread decreases in an axial direction away from the cutting end, forming a first taper.

19. The tool of claim 18, wherein at least two of the second major diameter, second minor diameter, and second pitch diameter of the threaded receiver decrease in an axial direction away from the opening, forming a second taper.

20. The tool of claim 19, wherein the first taper is larger than the second taper, providing an interference fit when the coupling portion and the threaded receiver are coupled.

21. The tool of claim 12, wherein:
the threaded receiver includes a threaded interior surface;
the threaded interior surface comprising a number of start threads corresponding to the number of start threads disposed on the coupling portion of the modular cutter;
in an assembled state, in which the holder and the cutter head are directly coupled to one another:
the threaded receiver and the coupling portion are coupled via threaded engagement of the start threads of the coupling portion and the start threads of the threaded interior surface; and stress associated with the threaded engagement is redistributed away from the cutting end of the elongated body portion.

22. The cutter head of claim 1, wherein each of the start threads covers at least one complete rotation about a circumference of the coupling portion.

23. The tool of claim 12, wherein each of the start threads covers at least one complete rotation about a circumference of the coupling portion.

* * * * *